(12) United States Patent
Kesler

(10) Patent No.: US 10,417,058 B1
(45) Date of Patent: Sep. 17, 2019

(54) METHOD AND SYSTEM FOR EXECUTING APPLICATION PROGRAMMING INTERFACE (API) REQUESTS BASED ON PARENT-CHILD OBJECT RELATIONSHIPS

(71) Applicant: INTUIT INC., Mountain View, CA (US)

(72) Inventor: Grigoriy Kesler, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 15/995,652

(22) Filed: Jun. 1, 2018

(51) Int. Cl.
| | |
|---|---|
| G06F 13/00 | (2006.01) |
| G06F 9/44 | (2018.01) |
| G06F 9/46 | (2006.01) |
| G06F 3/00 | (2006.01) |
| G06F 9/54 | (2006.01) |
| G06F 9/448 | (2018.01) |
| G06F 16/21 | (2019.01) |
| G06F 16/2453 | (2019.01) |

(52) U.S. Cl.
CPC ............ G06F 9/54 (2013.01); G06F 9/448 (2018.02); G06F 16/211 (2019.01); G06F 16/2453 (2019.01)

(58) Field of Classification Search
CPC ...................................................... G06F 9/54
USPC ............................................................ 719/318
See application file for complete search history.

(56) References Cited

U.S. PATENT DOCUMENTS

| | | | | |
|---|---|---|---|---|
| 8,756,617 | B1 * | 6/2014 | Boodman | G06F 21/53 |
| | | | | 719/328 |
| 9,424,112 | B1 * | 8/2016 | Malamut | G06F 9/547 |
| 9,667,704 | B1 * | 5/2017 | Sonawane | H04L 67/10 |
| 2016/0077897 | A1 * | 3/2016 | Tsang | G06F 9/45529 |
| | | | | 719/328 |

* cited by examiner

Primary Examiner — Timothy A Mudrick
(74) Attorney, Agent, or Firm — Patterson + Sheridan, LLP

(57) ABSTRACT

Aspects of the present disclosure provide techniques for executing requests in an object schema-based application programming interface (API) based on parent-child relationships between data objects. Embodiments include receiving an API request from a client application. The API request identifies a navigable path through a graph projection of the API and includes a plurality of nodes in the graph. In response, one or more data objects to resolve, including an ultimate parent object to be returned as a response to the query, are identified based on an object schema associated with each node in the query. A dependency graph identifying an order in which the data objects are to be resolved is generated based on parent-child relationships between the identified one or more data objects. The data objects are resolved based on the dependency graph, and the ultimate parent object is returned to the client application.

20 Claims, 6 Drawing Sheets

METHOD AND SYSTEM FOR EXECUTING APPLICATION PROGRAMMING INTERFACE (API) REQUESTS BASED ON PARENT-CHILD OBJECT RELATIONSHIPS

INTRODUCTION

Aspects of the present disclosure generally relate to parent-child relationships in object schema-based application programming interfaces (APIs), and more specifically to processing API function calls using a graph generated from object schemas defining an API and parent-child relationships defined between objects in the graph.

BACKGROUND

Application programming interfaces (APIs) generally expose various routines and methods to software developers for use in obtaining and modifying data using features of a software application. These APIs may be accessible programmatically (e.g., as function calls programmed in an application or function library) or via a web resource for web-based applications. Web-based applications can invoke functionality exposed by an API, for example, using a Representational State Transfer function call (a RESTful function call). A RESTful call generally uses HTTP requests to invoke a function exposed by a web-based API and provides data to the invoked function for processing. In other cases, web-based applications can invoke API functions using queries encapsulated in, for example, an HTTP POST request, a Simple Object Access Protocol (SOAP) request, or other protocols that allow client software to invoke functions on a remote system.

API functions generally provide for the ability to commit data objects to a data store or retrieve specified data from a data store. These data objects may include a plurality of attributes that define various properties of the data object to be committed to or retrieved from a data store. The attributes included in a data object may be defined as primitive data types—data types that are natively supported by a programming language (e.g., integers, long integers, single and double precision floating point numbers, characters, strings, Boolean values, etc.)—or other data objects.

To resolve data objects requested when a client application invokes an API function, a system may generate a plurality of queries against a data store to request the specified data objects. In some cases, the plurality of queries may be generated against a single instance of a data store. While data objects may be stored in and retrieved from a single instance of a data store, reliance on a single instance of a data store may have performance and reliability implications. For example, because each API function may result in the generation of a plurality of discrete queries against the data store, processing latencies may occur in the resolution of the requested data objects from the execution of a series of requests for a specific invocation of the API function call. Further, because the queries generated from an API request may not be executed atomically (i.e., all the queries associated with a single API request may not be executed before queries associated with a different API request are executed), additional delays may be introduced into the resolution of the requested data objects. Still further, maintaining a single data store may create a single point of failure for software systems that rely on the data exposed by the API.

Thus, what are needed are systems and methods for efficiently processing API function calls involving the resolution of data objects.

BRIEF SUMMARY

Certain embodiments of the present disclosure provide a computer-implemented method for executing data queries in an object schema-based application programming interface (API). The method generally includes receiving an API request from a client application. The API request generally identifies a navigable path through a graph projection of the API, and the navigable path includes a plurality of nodes in the graph projection of the API. Responsive to receiving the API request, the method further includes identifying one or more data objects to resolve based, at least in part, on an object schema associated with each node in the API request. The one or more objects include an ultimate parent object to be returned as a response to the API request. A dependency graph is generated for the one or more objects. The dependency graph generally identifies an order in which the one or more data objects are to be resolved based, at least in part, on parent-child relationships between each of the identified one or more data objects. The one or more data objects, including the ultimate parent object, are resolved based on the dependency graph, and the ultimate parent object is returned to the client application as a result of the API request.

Other embodiments provide a system comprising a processor and a non-transitory computer-readable medium that when executed, cause the processor to perform an operation for executing data queries in an object schema-based application programming interface (API). The operation generally includes receiving an API request from a client application. The API request generally identifies a navigable path through a graph projection of the API, and the navigable path includes a plurality of nodes in the graph projection of the API. Responsive to receiving the API request, the operation further includes identifying one or more data objects to resolve based, at least in part, on an object schema associated with each node in the API request. The one or more objects include an ultimate parent object to be returned as a response to the API request. A dependency graph is generated for the one or more objects. The dependency graph generally identifies an order in which the one or more data objects are to be resolved based, at least in part, on parent-child relationships between each of the identified one or more data objects. The one or more data objects, including the ultimate parent object, are resolved based on the dependency graph, and the ultimate parent object is returned to the client application as a result of the API request.

Still further embodiments provide a system for executing data queries in an object schema-based application programming interface (API). The system generally includes a request processor and one or more data stores storing data associated with one or more data objects. The request processor is generally configured to perform an operation including receiving an API request from a client application. The API request generally identifies a navigable path through a graph projection of the API, and the navigable path includes a plurality of nodes in the graph projection of the API. Responsive to receiving the API request, the operation further includes identifying one or more data objects to resolve based, at least in part, on an object schema associated with each node in the API request. The one or more objects include an ultimate parent object to be returned as a response to the API request. A dependency graph is generated for the one or more objects. The dependency graph generally identifies an order in which the one or more data objects are to be resolved based, at least in part, on parent-child relationships between each of the identified one or more data objects. The one or more data objects, including the ultimate parent object, are resolved based on the dependency graph, and the ultimate parent object is returned to the client application as a result of the API request.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for executing API requests originating from a client application using a dependency graph generated based on parent-child relationships between different data objects.

An object schema-based API generally exposes function calls as a variety of navigable paths through a graph projection, or representation, of the API. Generally, a graph representation of an API includes a root node and a plurality of child nodes, with each child node representing a function exposed by the API (e.g., to request or write data to a data store, analyze data in a data store, and so on). The graph may be generated using a group of object schema definition files. Each object schema definition file can define one or more nodes (functions). Each node may be defined in terms of the data objects provided by a node, required and optional parameters for functions supported by a node, relationships between nodes (e.g., parent/child nodes), and relationships between data objects provided by the node and other data objects that may need to be resolved in order to resolve the data objects provided by the node.

An API function call may request the commitment of a specified data object to a data store or the retrieval of a specified data object from the data store. This specified data object may be defined as an ultimate parent object that may be the final object resolved in execution of the API function call invoked by a client application. To generate a dependency graph based on parent-child relationships between different objects to be resolved in order to execute the invoked API function call, a request processor can traverse the graph projection of the API to identify the nodes in the graph projection of the API that are included in the invoked API function call and examine the object schemas associated with each of the identified nodes. For each object defined in the object schemas for each node included in the invoked API function call, the request processor generally identifies the data objects to be resolved and an order in which the data objects are to be resolved such that child data objects are resolved prior to resolution of a parent data object. For a write request, the resolution of a parent data object may result in the identified child data objects being committed to one or more data stores prior to commitment of the parent data object. For a read request, the resolution of a parent data object may result in the parent data object being identified prior to obtaining the child data objects.

Example Networked Environment for Executing API Requests

Figure 1:
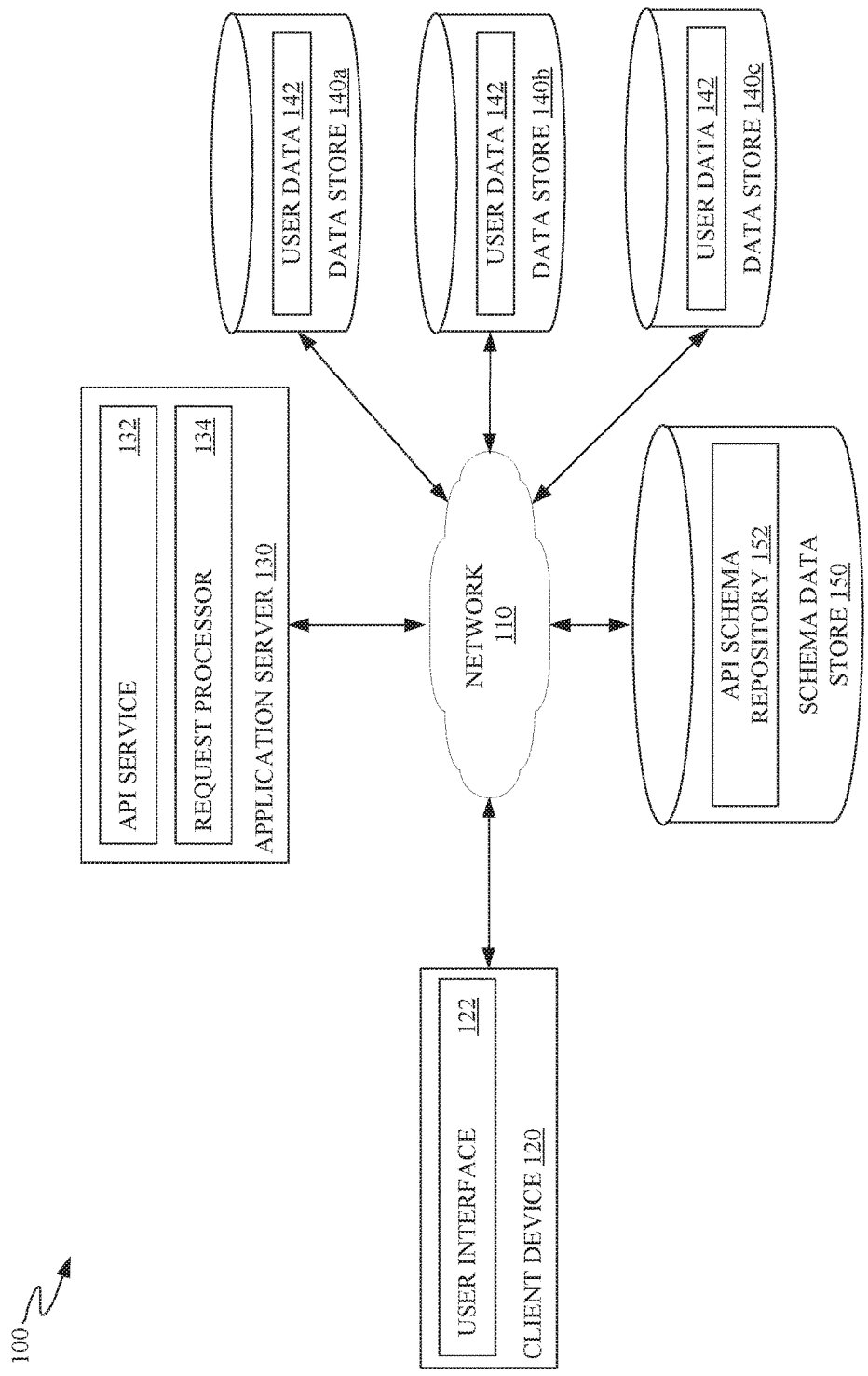
FIG. 1 illustrates an example networked environment in which application programming interface (API) requests originating from a client application are processed against a plurality of data stores using a dependency graph generated based on parent-child relationships between different data objects.

FIG. 1 illustrates an example networked environment in which API requests are executed using dependency graphs generated based on parent-child relationships between data objects, according to an embodiment of the present disclosure. As illustrated, networked environment 100 includes a client device 120, an application server 130, a plurality of data stores 140a-140c, and a schema data store 150, communicatively connected via network 110. While FIG. 1 illustrates three data stores—data stores 140a, 140b, and 140c—it should be recognized by one of ordinary skill in the art that data used to resolve API requests may be stored across any number of data stores.

Client device 120 generally is illustrative of a variety of connected devices that may be used by a user to access an application or features thereof through application server 130. Client device 120 may be, for example, a desktop computer, a laptop computer, a tablet device, a mobile phone, a smart wearable device, an internet connected appliance, or other computing device with networked communications capabilities. As illustrated, client device 120 includes a user interface 122. User interface 122 generally receives requests from a user of client device 120 for specified application content and invokes one or more functions on application server 130 to execute one or more queries against a data store (e.g., against one or more data stores 140), as discussed in further detail herein. User interface 122 may be deployed as part of an application installed on client device 120 or provided by application server 130 for applications deployed as a web application with the user interface 122 displayed in a web browser and the functionality of the application executing on application server 130.

Application server 130 generally includes an API service 132 and a request processor 134. API service 132 generally exposes functions supported by the API as a graph projection of the API. The graph projection of the API generally includes a plurality of interconnected nodes defined by object schemas (e.g., stored in object schema repository 150). These object schemas may define, for example, data objects returned by querying a particular node in the graph projection of the API, attributes of the data objects returned by querying that node in the graph projection of the API, parent-child relationships between different data objects defined in the API, functions that can be performed on data objects, and the like. In some embodiments, the object schema defining a given data object may explicitly identify a parent data object of the given data object. The API exposed at application gateway 130 generally has a root node, and each request for data interaction (i.e., read and/or write requests) may be defined in relation to a navigable path in the graph (e.g., a path originating at the root node and traversing one or more other nodes in the graph projection).

When API service 132 receives an API request from client device 120, API service 132 traverses the navigable path through the graph projection of the API to identify one or more data objects to resolve in order to satisfy the received API request. The one or more data objects to resolve generally include an ultimate parent object representing the data object requested by client device 120 and one or more child objects that generally are to be resolved prior to final resolution of the ultimate parent object. To identify the one or more data objects to resolve in order to satisfy the received API request, API service 132 can obtain the object schemas defining each node in the navigable path to identify data objects representative of each node in the navigable path and the attributes of each identified data object. The attributes of each identified data object may include information identifying the type of each attribute. These attributes may be primitive data types, which are data types natively supported by a programming language, or object data types, which are data types that serve as a container for related data which themselves may be defined as primitive data types or object data types. Where a first object includes attributes that are object data types, those attributes may be considered child data objects to the first data object, which may, in turn, be a child data object of yet another data object. In some embodiments, the object schemas may also identify a service (e.g., a server, a cluster of servers, or some other local or networked resource) that stores the data associated with a data object and against which queries are to be executed in order to resolve the data object.

In some embodiments, the API service 132 may use metadata associated with the object schemas defining nodes in the API to identify one or more data objects to resolve in order to satisfy the received API request. This metadata may be generated by converting object schemas in a markup language (e.g., an XML file, a YAML file, a JSON file, etc.) to machine optimized data in order to accelerate the process of identifying the one or more data objects to resolve. The metadata may be generated when the graph projection of the API is initially defined and as extensions are added to the API, and the metadata may be stored locally at application server 130 or at schema data store 150 for future retrieval.

To execute the API request, API service 132 generates a plurality of subqueries against one or more identified services, based on the object schemas associated with each node in the navigable path identified by the API request, in order to resolve child data objects before resolving the parent data objects. API service 132 generally uses the parent-child data object relationships to generate dependency graph used to define an order in which objects are resolved in order to execute the API request. The dependency graph generated to define the order in which objects are to be resolved in order to execute the API request generally may be structured as a graph in which the ultimate parent object to be resolved in order to execute the API request is positioned as the root node of the graph, and data objects other than the ultimate parent object are inserted into the graph as child nodes based on parent-child relationships between the data objects. These dependency graphs may be generated for each received API request to facilitate the execution of each received API request according to the unique navigable path through the graph projection of the API defined by each received API request.

Generally, a dependency graph used to define an order in which objects are to be resolved in order to execute the API request includes a plurality of execution levels, which are the sets of nodes in the graph at the same distance away from the root of the dependency graph. The root node of the dependency graph generally is associated with an ultimate parent object associated with an API request, or the data object to be returned to a client device or generated in response to the API request. Immediate child objects of the ultimate parent object may be placed in the second execution level of the dependency graph (i.e., have a distance of 1 from the root node of the dependency graph). Subsequent child objects may be placed at progressively lower levels of the dependency graph (i.e., have increasing distances from the root node of the dependency graph) based on parent-child relationships defined for each object.

In some embodiments, the dependency graph may be generated such that child data objects are resolved individually. As an illustrative example, consider an API request having an ultimate parent object with a number n of child data objects, where each of the n child data objects have no other child data objects to be resolved. To execute this API request, a maximum of n+1 subqueries may be generated (i.e., one subquery for each of the n child data objects and a subquery to resolve the ultimate parent data object). The dependency graph used to resolve the API request may thus be represented as a graph with a root node representing the ultimate parent data object and a single level of n child nodes, connected to the root node, representing each child data object to be resolved prior to resolving the ultimate parent data object.

In some embodiments, API service 132 can optimize the dependency graph to provide for execution of subqueries at a given execution level of the dependency graph substantially in parallel. Optimizing the dependency graph may include examining the dependency graph to identify concurrently resolvable data objects in a given execution level of the dependency graph. Generally, concurrently resolvable data objects include data objects at the same execution level of the dependency graph for which child data objects, if any, have already been resolved and which may be resolved against different services. For data objects that are maintained by different services, API service can generate subqueries against those different services, and as discussed in further detail below, request processor 134 can transmit the generated subqueries for the data objects at a given execution level of the dependency graph to their respective services substantially in parallel.

In some embodiments, the dependency graph may be generated in an optimized manner to minimize the number of subqueries executed in order to resolve the API request. API service 132 generally identifies services associated with concurrently resolvable data objects to identify a minimum set of subqueries needed to resolve the data objects at a given execution level of the dependency graph. To identify the services associated with the data objects resolved at a given execution level of the dependency graph, API service 132 can obtain the object schema associated with each of the data objects and read service provider information identified in the object schema. The minimum set of subqueries may be, for example, the number of unique services against which subqueries are to be executed in order to resolve the data objects at a given execution level. Where multiple data objects at a given level of the dependency graph are resolved against a common service (i.e., the object schemas associated with these data objects indicate that the same service provider maintains these data objects), the individual subqueries for those data objects may be coalesced into a single subquery. As discussed in further detail below, the individual subqueries for the concurrently resolvable data objects at a given execution level of the dependency graph may be transmitted to the identified services substantially in parallel such that data objects resolved by a common service are resolved using a single subquery against that common service. Resolution of data objects at the same execution level of the dependency graph may be performed at substantially the same time to reduce processing latencies that would be involved in sequentially executing subqueries to resolve data objects that do not depend on each other.

In some embodiments, the dependency graph generated for a specific API request (which, as discussed, represents a specific navigable path through the graph projection of the API) may be cached at application server 130 or otherwise stored at schema data store 150 for future use. Generally, the dependency graph may be stored with information associating the dependency graph with a specific API request, with specific identifiers in the API request replaced by wildcard characters. When API service 132 receives a request, API service 132 can search the cache for a dependency graph associated with a request matching the received request. If API service 132 finds a matching request, API service 132 can retrieve the associated dependency graph and provide that graph to request processor 134 for execution. Otherwise, API service 132 can generate a dependency graph for the received request as discussed above and commit the generated dependency graph to cache or storage for future use.

After API service 132 generates a dependency graph representing the order in which data objects are to be resolved in order to execute the API request or retrieves the dependency graph from cache, API service 132 can pass a data structure containing the dependency graph to a request processor 134 for execution. The data structure containing the dependency graph may be, for example, a structured text file identifying the data objects to be resolved and the order in which the data objects are to be resolved, a graph data object including each data object as a node, with each node identifying connections to other nodes (if any), or other appropriate data structures. In some embodiments, API service 132 can traverse the dependency graph to execute subqueries in different execution levels of the dependency graph substantially sequentially and execute subqueries in the same execution of the dependency graph substantially in parallel, as discussed in further detail herein. Subqueries to resolve the data objects in a particular branch of the dependency graph may be executed starting with the lowest level child data objects in the dependency graph (i.e., the child data objects identified in the lowest execution level of the dependency graph) and progressively executing subqueries to resolve data objects in higher execution levels of the dependency graph.

Regardless of whether request processor 134 receives an optimized dependency graph from API service 132, request processor 134 can execute the API request by traversing the dependency graph on a depth-first basis or on a breadth-first basis. If the dependency graph is traversed on a depth-first basis, different branches of a dependency graph may be resolved sequentially until the ultimate parent object is resolved. If the dependency graph is traversed on a breadth-first basis, request processor 134 can execute subqueries at any given execution level of the dependency graph substantially in parallel and execute the subqueries at different execution levels of the dependency graph sequentially starting with resolution of the lowest level child data objects and ending with resolution of the ultimate parent object.

In some embodiments, where request processor 134 receives an unoptimized dependency graph from API service 132, request processor 134 can identify concurrently resolvable data objects at a given execution level of a dependency graph based on the parent data object identified in object schemas associated with the data objects to be resolved at that execution level of the dependency graph. For each identified parent data object at a given execution level of the dependency graph, request processor 134 can identify child data objects that are resolved by querying a common service and child data objects that are resolved by querying different services. As discussed above, the child data objects that are resolved by querying the same service can be coalesced into a single subquery against that service, and the subqueries against the different services needed to resolve the child data objects of an identified parent data object can be resolved substantially in parallel. In some embodiments, request processor can resolve parent data objects sequentially by resolving the child data objects of a first parent data object, resolving the first parent data object, and repeating the process for other parent data objects in the given execution level of the dependency graph.

In some embodiments, request processor 134 can identify concurrently resolvable data objects at a given execution level of a dependency graph regardless of the parent data object associated with the data objects at that execution level of the dependency graph. For example, consider an API request in which an ultimate parent object has two first-level child objects, and each of the two first-level child objects have two second-level child objects, resulting in a total of four second-level child objects to be resolved. Of these second-level child objects, assume that one of the second-level child objects for each of the first-level child objects can be resolved against a first service, and the other second-level child objects are resolved against other services. Request processor 134 can resolve the second-level child objects by generating three subqueries: a first subquery to resolve the two second-level child objects maintained by the first service; a second subquery to resolve the second-level child object maintained by the second service; and a third subquery to resolve the second-level child object maintained by the third service. As discussed above, the three subqueries for resolving the four second-level child objects may be transmitted to the respective services substantially in parallel for execution such that the second-level child objects may be resolved substantially concurrently despite the fact that the four second-level child objects are child of different first-level child objects (i.e., execution of a query to resolve one of the second-level child objects need not wait for execution of a another query to resolve another one of the second-level child objects to complete).

Data stores 140 generally are repositories storing data that request processor 134 can access to satisfy requests for data received at application server 130. As illustrated, each data store 140 generally includes user data 142 and other application-related data in a sortable and searchable state (e.g., in a relational database, a non-relational database, in a flat data store, etc.). In response to a query received from request processor 134 at application server 130, data store 140 can return data objects matching the parameters included in the request, and request processor 134 may perform additional processing on the returned data before providing the data to a client device 120 via API service 132.

Schema data store 150 generally is a repository for storing object schema definition files for each node, or query, available in an API. As illustrated, schema data store 150 includes API schema repository 152. Data stored in API schema repository 152 may define one or more functions provided by the API and data objects returned as a response to the one or more functions of the API or created through an invocation of one or more functions of the API. In some cases, schema data store 150 may also store a graph projection of the API that API service 132 can use to identify a function invoked by an API request and the data objects to resolve in order to satisfy the API request. The graph projection of the API may include functions defined by the developer of the API, as well as extensions added to the API by other developers, both of which may be defined by object schema definition files stored in API schema repository 152.

Example Object Schema and Dependency Graph

Figure 2:
FIG. 2 illustrates an example object schema defining an ultimate parent object and a plurality of child objects.

FIG. 2 illustrates an example object schema 200 defining a parent data object and a plurality of child data objects, according to an embodiment of the present disclosure. Object schema 200 may be structured as an eXtensible Markup Language (XML) file, a JavaScript Object Notation (JSON) file, or any other type of parseable data file. While FIG. 2 illustrates an invoice as an example parent data object, it should be recognized by one of ordinary skill in the art that any sort of data construct that can be represented as a parent data object with one or more child data objects as attributes can be implemented using a similar object schema definition.

As illustrated, the "invoice" data object is defined in object schema 200 as an object including three different attributes: "transactionDate", which is defined as a date primitive supported by a database system; contact, which is defined as an object of type "contactObject"; and lines, which is defined as an array of objects of type "lineObject". The "contactObject" and "lineObject" data objects are defined in object schema 200 as an object having the "invoice" data object as a parent object and having a plurality of attributes that are primitive data types. The "invoice" data object may be considered to be the ultimate parent object returned in response to a read request or written to a data store in response to a write request. The child objects, "contactObject" and "lineObject", may be resolved prior to resolution of the parent object, as discussed above. While the "contactObject" and "lineObject" data objects are illustrated in FIG. 2 as including only attributes that are primitive data types, it should be recognized that data objects at any level of dependency, like the "contactObject" and "lineObject" data objects illustrated herein, may include attributes that are also child data objects such that a given data object may be both a parent data object and a child data object.

As illustrated, both the "contactObject" and "lineObject" data objects define the "invoice" data object as a parent data object. Based on the definition of the "invoice" data object as a parent data object of the "contactObject" and "lineObject" data objects, API service 132 can generate dependency graph 300 illustrated in FIG. 3, and API service 132 and/or request processor 134 can optimize the generated dependency graph 300 as discussed above.

Figure 3:
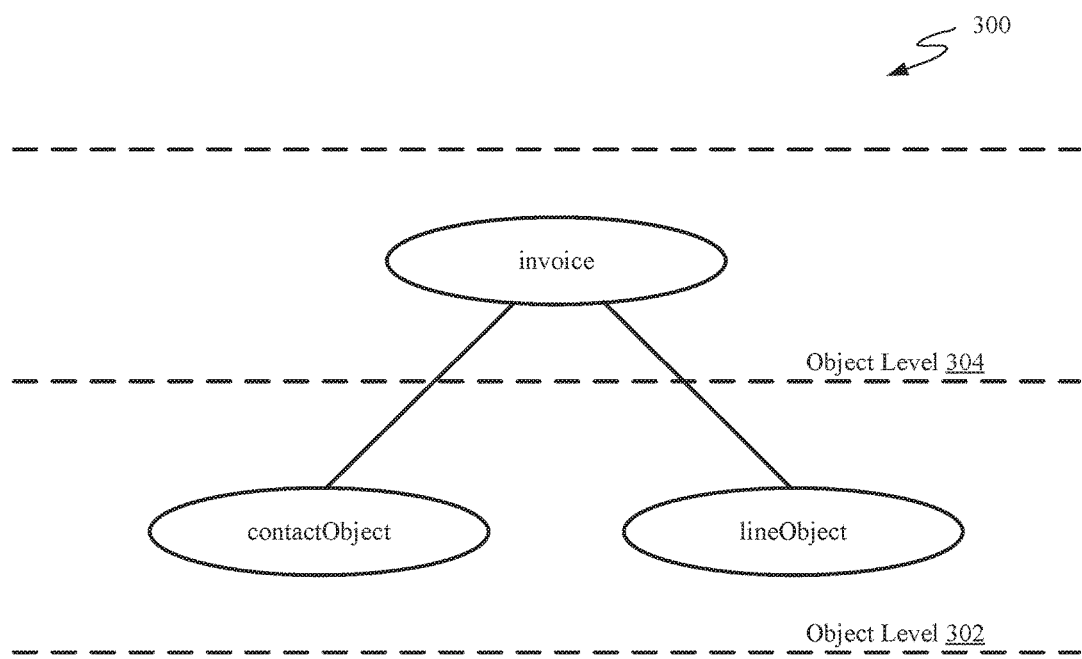
FIG. 3 illustrates an example dependency graph generated to resolve the ultimate parent object defined in the object schema of FIG. 2.

FIG. 3 illustrates a dependency graph 300 that includes object level 302 and object level 304. Object level 302 illustrates that the "contactObject" and "lineObject" data objects illustrated by the nodes at object level 302 of dependency graph 300 are child data objects of the "invoice" data object illustrated as the root node of dependency graph 300 in object level 304; meanwhile, as discussed above, the "invoice" data object may be considered the ultimate parent object of a request to resolve an invoice (i.e., to write an invoice to one or more data stores 140 or retrieve an invoice from one or more data stores 140).

As discussed above, request processor 134 can use dependency graph 300 to generate and execute the subqueries needed to resolve the invoice, "contactObject", and "lineObject" data objects and return a result to client device 120. Because the "contactObject" and "lineObject" data objects are child data objects at a lower execution level of the dependency graph, request processor 134 can generate subqueries to obtain the "contactObject" and "lineObject" data objects substantially in parallel. In one example, if the object schemas defining the "contactObject" and "lineObject" data objects specify that the "contactObject" and "lineObject" data objects are maintained by a common service, request processor 134 can coalesce the subqueries needed to resolve both the "contactObject" and "lineObject" data objects into a single subquery executable against the common service to resolve the data objects at object level 302 of dependency graph 300. The request processor 134 can transmit the single subquery to resolve the data objects at object level 302 of dependency graph 300 to the common service for execution, which reduces the number of subqueries executed to resolve the objects and execute an API request. Upon receiving the results of that single subquery, can subsequently execute a subquery to resolve the "invoice" data object (the ultimate parent object) at object level 304 of dependency graph 300.

In another example, if the object schemas defining the "contactObject" and "lineObject" data objects specify that the "contactObject" and "lineObject" data objects are maintained by different services, request processor 134 can generate subqueries to resolve the "contactObject" data object against a first service and the "lineObject" data object against a second service. Request processor 134 can transmit, substantially in parallel, the subqueries to the first service and second service to resolve the "contactObject" and "lineObject" data objects (i.e., the child data objects at object level 302), as these objects are included at the same execution level of dependency graph 300 and are maintained by different services. Upon resolution of the child data objects at object level 302, request processor 134 can subsequently execute a subquery to resolve the "invoice" data object (the ultimate parent object) at object level 304 of dependency graph 300.

Figure 4:
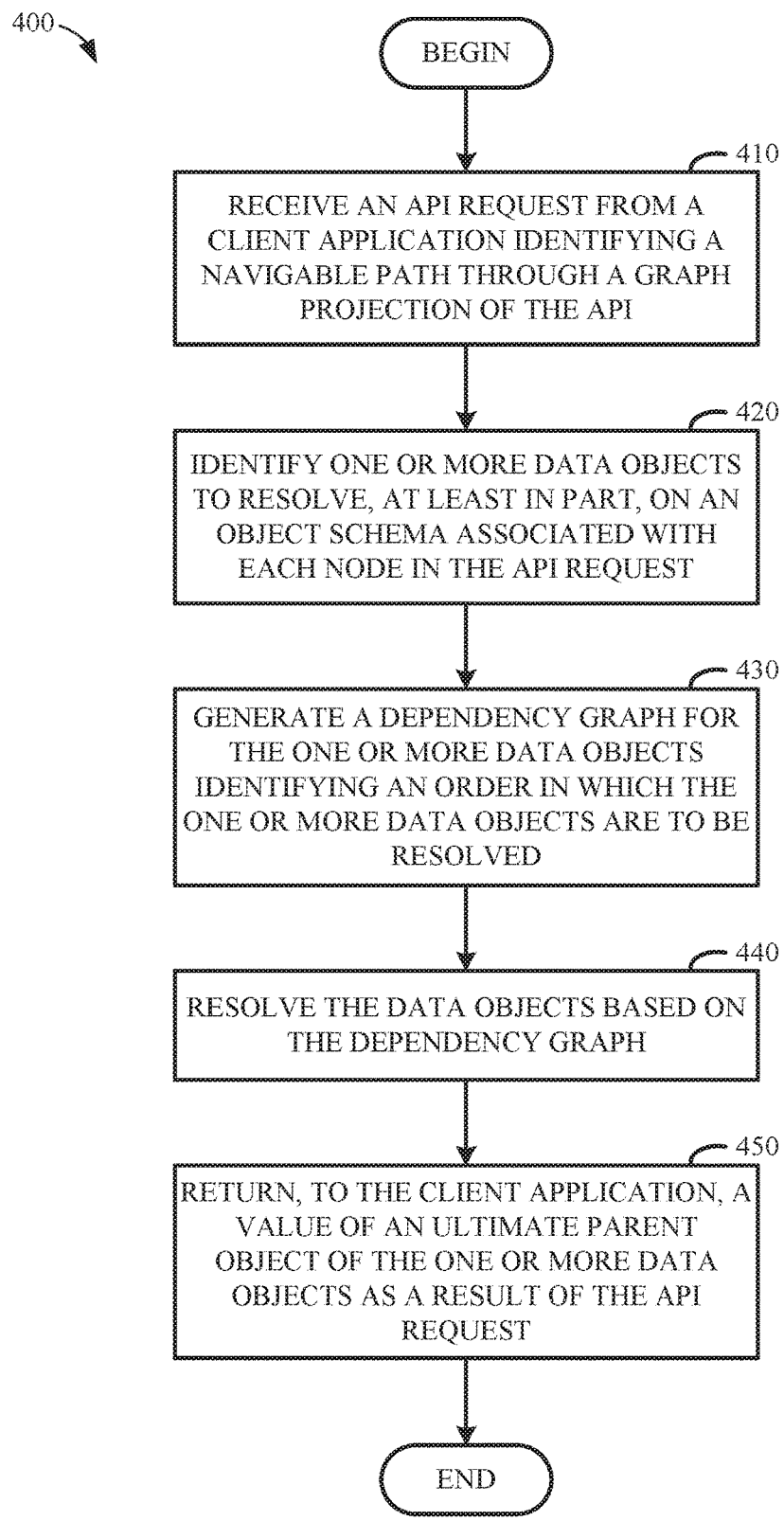
FIG. 4 illustrates example operations for executing an API request using a dependency graph generated based on parent-child relationships defined between different data objects in an object schema-based API.

Example Computer Implemented Method for Executing Data Queries Based on Parent-Child Relationships FIG. 4 illustrates example operations 400 for executing data queries in an object schema-based application programming interface (API) based on parent-child relationships defined for objects resolved in response to the data query.

As illustrated, operations 400 begin at block 410, where a system receives an API request from a client application. The API request specifies a function to be invoked in order to read data from or write data to one or more data stores 140. The function may be identified as a navigable path through a graph projection of the API. As discussed, the navigable path through the graph projection of the API may include a plurality of nodes, and each node in the graph projection of the API may be defined according to an object schema that identifies the data objects maintained by that node, the functions that can be performed on those data objects, and parent-child relationships for each of the identified data objects.

At block 420, the system identifies one or more data objects to resolve based, at least in part, on an object schema associated with each node in the navigable path through the graph projection of the API identified in the query. To identify the one or more data objects to resolve in order to satisfy the received API query, the system can examine the object schemas associated with each node in the navigable path through the graph projection of the API identified in the query to identify the data objects to be resolved at each node in the query. Because objects are defined in terms of parent-child data object relationships, where a parent data object may contain multiple child data objects, the system can first obtain a definition of a data object specified in the object schemas, which may be declared to be the parent data object for that node in the query. For the declared parent data object, the system parses the object schema to identify attributes of the data object that are also objects (i.e., to identify child data objects). For each of the child data objects, the system can obtain object schemas from schema repository 150 defining the child data objects and progressively identify subsequent child data objects.

At block 430, the system generates a dependency graph for the one or more data objects. The dependency graph, as discussed above, generally identifies an order in which the one or more data objects are to be resolved and may be generated based on parent-child relationships identified between the data objects to be resolved. The dependency graph may be organized with an ultimate parent object defined as the root node of the dependency graph, and subsequent data objects may be inserted into the dependency graph at the appropriate level based on the parent-child relationships between the data objects.

At block 440, the system resolves the one or more data objects based on the dependency graph. The one or more data objects may be resolved by generating a subquery for each data object at a given dependency level of the dependency graph, and executing the subqueries in different execution levels of the dependency graph sequentially for a given branch of the dependency graph. In some embodiments, the system can optimize the subqueries generated to resolve the data objects identified in the dependency graph to accelerate execution of the subqueries generated to satisfy the API request.

For example, as discussed above, a system can examine the data objects included at a given level of a dependency graph for opportunities to coalesce subqueries executable against the same service into a single subquery. In some embodiments, the subqueries generated to satisfy the API request may be optimized on a per-parent-object basis such that the subqueries to resolve the child objects of a given parent object are reduced into the minimal set of subqueries needed to resolve the child objects of that parent object. In other embodiments, the subqueries generated to satisfy the API request may be optimized on a per-execution-level basis so that the subqueries needed to resolve data objects at a given execution level of the dependency graph are reduced to the minimal set of subqueries needed to resolve the data objects at any given execution level, regardless of the parent-child relationships associated with any of the data objects. Based on the dependency graph and any optimizations introduced into the subqueries represented by the dependency graph to reduce the number of discrete subqueries executed in order to resolve the API request, the system can execute the subqueries to resolve the one or more data objects. Resolution of the one or more data objects may begin with the data objects at the lowest level of the dependency graph and progressively work upwards until the ultimate parent data object is resolved.

At block 450, the system returns a value of the ultimate parent object of the one or more data objects to the client application as a result of the API query.

In some embodiments, the order in which the one or more data objects are to be resolved in order to execute the received API request may be an order in which a first data object of the one or more data objects is resolved subsequent to the resolution of the child data objects identifying the first object as a parent data object. As discussed, the identification of the parent data object may be included in object schemas associated with the child data objects.

As discussed, the dependency graph generated for the one or more objects may result in a dependency graph with multiple execution levels. For example, consider a scenario in which a first object of the one or more objects is identified (1) as a child of a second object of the one or more objects and (2) as a parent object of a third object of the one or more objects. The resulting dependency graph may be structured such that the third object is resolved prior to resolution of the first object, and the first object is resolved prior to resolution of the second object.

In some embodiments, the dependency graph is organized into a plurality of execution levels, with each execution level including nodes the same distance away from the root node of the dependency graph representing the ultimate parent object to be resolved. To resolve the one or more objects based on the dependency graph, a system can identify concurrently resolvable data objects in one of the plurality of execution levels in the dependency graph. One or more queries may be generated to resolve the concurrently resolvable data objects, and the generated queries may be transmitted substantially in parallel to the services associated with the concurrently resolvable data objects.

In some embodiments, generating the one or more queries to resolve the plurality of concurrently resolvable data objects may include identifying a plurality of the concurrently resolvable data objects associated with a common service. As discussed, the identification of concurrently resolvable data objects associated with a common service generally includes identifying data objects at a given execution level of the dependency graph that specify the same service provider in their respective object schemas. For the plurality of concurrently resolvable data objects associated with the common service, a single query is generated to resolve the concurrently resolvable data objects associated with the common service.

In some embodiments, generating the one or more queries to resolve the concurrently resolvable objects includes identifying one or more services associated with the concurrently resolvable data objects. These services may be identified, for example, in object schemas associated with each of the one or more data objects. For each of the identified services, a system can generate a request for resolution of the concurrently resolvable data objects associated with a particular service of the identified services.

In some embodiments, concurrently resolvable objects may include data objects having a common parent object identified in object schemas associated with the concurrently resolvable data objects. In some embodiments, the concurrently resolvable data objects may be data objects having different parent objects identified in object schemas with the concurrently resolvable data objects and no child objects remaining to be resolved. These objects may be at the same or different execution levels of the dependency graph.

In some embodiments, identifying the one or more object to resolve to satisfy the query includes traversing the navigable path through the graph projection of the API. As discussed, the navigable path includes a plurality of nodes of the graph projection of the API. For each node, the system examines the object schema associated with the node, and the object schema generally includes information specifying the one or more objects to be resolved for the node.

Figure 5:
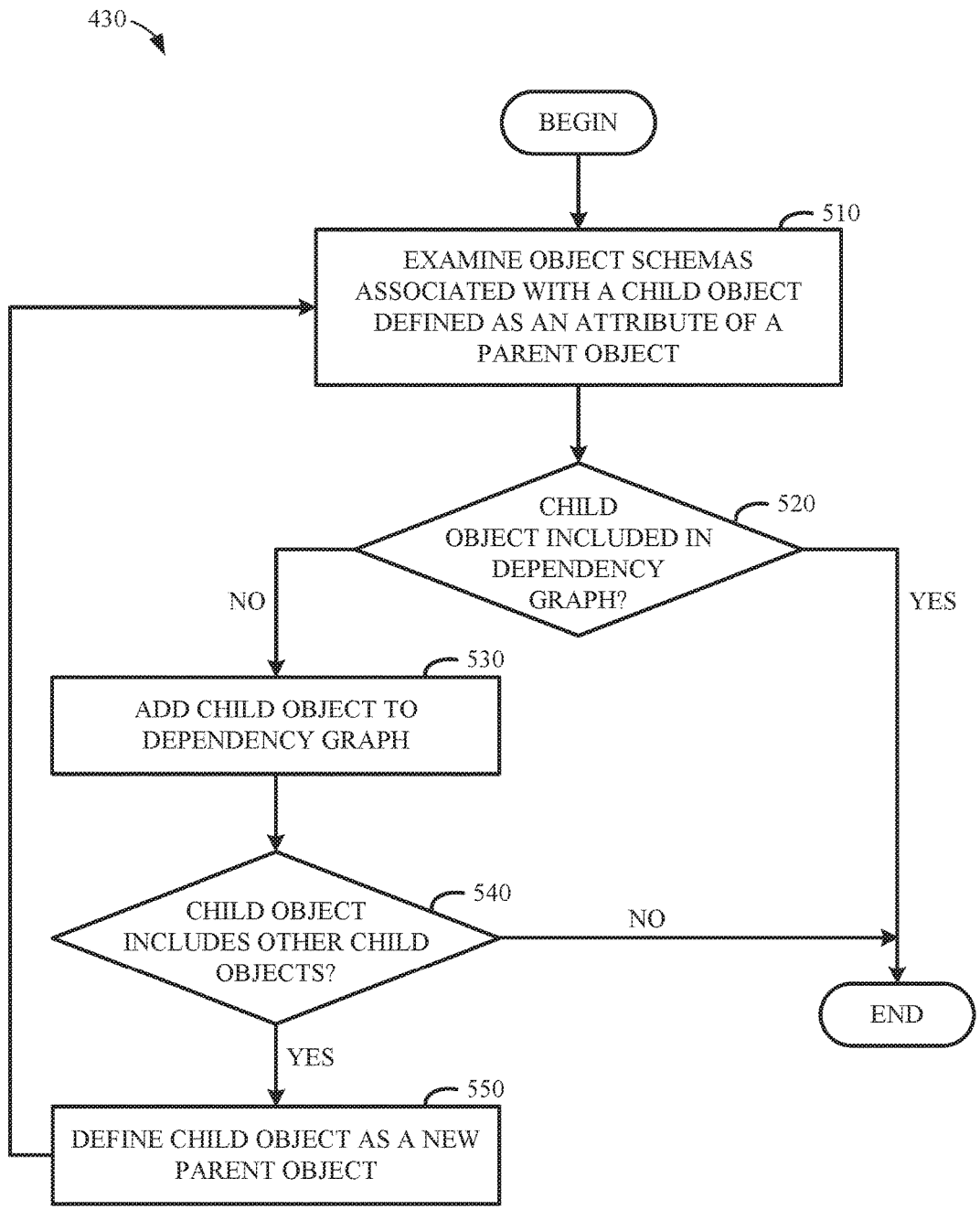
FIG. 5 illustrates example operations for generating a dependency graph based on parent-child relationships defined between different data objects in an object schema-based API.

FIG. 5 illustrates example operations 430 for generating a dependency graph for resolving a data object. Generally, operations 430 may be repeated for each data object identified as an object to be resolved in order to satisfy an API request until all the data objects to be resolved are included in the dependency graph.

As illustrated, operations 430 begin at block 510, where a system examines object schemas associated with a child object defined as an attribute of a parent object. As discussed, an object schema for a parent data object generally specifies the attributes of that parent object, which may include a plurality of attributes defined as child data objects of the parent object.

At block 520, the system traverses through the existing, partially-built dependency graph to determine if the child object is included in the dependency graph. In some embodiments, the system can traverse through the existing, partially-built dependency graph to determine if the child object is included in a specific execution level of the dependency graph. If the child object is already included in the dependency graph, the child object need not be added to the dependency graph again. Further, because the child object is already included in the dependency graph, it can be assumed that any further data objects identifying the child object as a parent object, directly or indirectly, have also been added to the dependency graph. Thus, operations 430 can terminate.

If, however, the system determines that the child object is not already included in the dependency graph, operations 430 proceed to block 530, where the system adds the child object to the dependency graph. Generally, the child object is added to the dependency graph as a child node (i.e., in a lower execution level) of its identified parent object).

At block 540, the system determines whether the child object includes other child objects (i.e., whether the child object is a parent object to other child objects). To determine if the child object includes other child objects, a system can examine the object schema associated with the child object to identify attributes of the child object and determine if any of the attributes of the child object are data objects.

If, at block 540, the system determines that the child object includes other child objects, at block 550, the system can define the child object as a new parent object. Operations 430 may return to block 510 to identify subsequent child objects for the new parent object.

Example System

Figure 6:
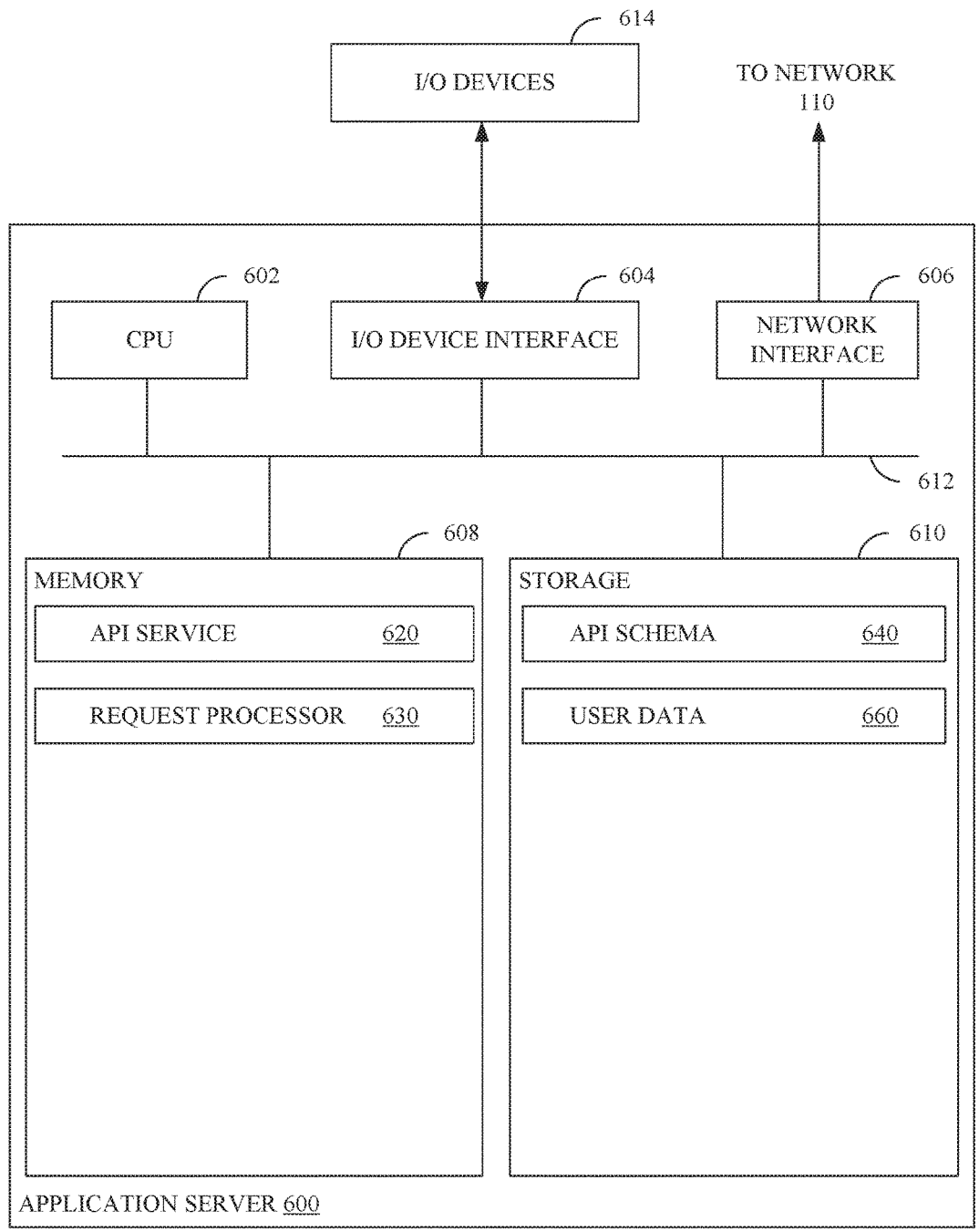
FIG. 6 illustrates an example computing system with which embodiments of the present disclosure may be implemented.

FIG. 6 illustrates an example system 600 for executing data queries in an object schema-based application programming interface (API) based on parent-child relationships between data objects, according to embodiments of the present disclosure. For example, system 600 may be representative of application server 130 illustrated in FIG. 1.

As shown, system 600 includes a central processing unit (CPU) 602, one or more I/O device interfaces 604 that may allow for the connection of various I/O devices 514 (e.g., keyboards, displays, mouse devices, pen input, etc.) to the system 600, network interface 606, a memory 608, storage 510, and an interconnect 512.

CPU 602 may retrieve and execute programming instructions stored in the memory 608. Similarly, the CPU 602 may retrieve and store application data residing in the memory 608. The interconnect 512 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes an API service 620 and a request processor 630. API service 620 generally receives a request to execute one or more functions provided by an API from a client device 120 (e.g., via network interface 606). The request generally may be structured as a navigable path through a graph projection of an API, and the navigable path generally includes a plurality of nodes in the graph projection of the API. Each node is associated with an object schema that defines the data objects associated with a node in the graph projection API, and each data object may include attributes defined as primitive data types or other data objects. In response to receiving the request, API service 620 examines the object schemas associated with each node in the navigable path through the graph projection of the API to identify the data objects to be resolved in order to satisfy the request. Based on parent-child relationships defined for each of the data objects, API service 620 generates a dependency graph illustrating the parent-child relationships for each of the data objects. The dependency graph generally includes an ultimate parent object defined as the root node of the dependency graph and one or more levels of child data objects connected, directly or indirectly, to the root node of the dependency graph.

Request processor 630 generally uses the dependency graph generated by API service 620 to generate and execute one or more subqueries to resolve the data objects, including the ultimate parent object, included in the dependency graph in order to satisfy the API request. In some embodiments, request processor 630 can optimize the dependency graph to reduce the number of subqueries generated and executed to resolve the data objects. For example, at a given level of a dependency graph, request processor 630 can identify data objects that are maintained by the same service. The subqueries generated for data objects maintained by the same service may be coalesced into a single subquery, which reduces the number of discrete queries executed against a given service. Further, to accelerate resolution of the one or more data objects, request processor 630 can transmit, substantially in parallel, subqueries to resolve the data objects at a given level of the dependency graph to the respective services that maintain those data objects. By transmitting the subqueries substantially in parallel, request processor 630 can cause data objects at a given level of the dependency graph to be resolved simultaneously or nearsimultaneously rather than sequentially, even though the data objects at a given level of the dependency graph may not depend on one another.

Storage 610 includes an API schema 640 and user data 650. API schema 640 generally provides a data store that includes object schema definition files for each of the nodes in a graph projection of the API, which may include object schemas defined by a developer of the API or by external developers adding extensions to the API. In some cases, API schema 640 can additionally store a graph projection of the API, which may be updated over time as developers add extensions to the API. The object schemas associated with each node in the graph projection of the API may include information defining the data objects associated with each node in the graph projection of the API and attributes of each data object, including information about whether the data object is a child object of another object and/or whether the data object is a parent data object to other child objects.

User data 650 generally includes data that application gateway system stores for an application and can provide in response to a query received at a request processor. User data 650 may be maintained, for example, in a relational database, and a request processor can execute database queries on user data 650 based on the parameters included in the query and formatted according to a variability schema associated with the invoked API function call. In some cases, user data 650 may be maintained in a non-relational data store, and request processor can generate queries for user data 650 based on, for example, key-value pairs or other data points.

The preceding description provides examples, and is not limiting of the scope, applicability, or embodiments set forth in the claims. Various modifications to these embodiments will be readily apparent to those skilled in the art, and the generic principles defined herein may be applied to other embodiments. The preceding description is provided to enable any person skilled in the art to practice the various embodiments described herein. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A developer interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for executing data queries in an object schema-based application programming interface (API), comprising:
   receiving an API request from a client application, wherein:
     the API request identifies a navigable path through a graph projection of the API, and
     the navigable path includes a plurality of nodes in the graph projection of the API;
   responsive to receiving the API request, identifying one or more data objects to resolve based, at least in part, on an object schema associated with each node in the API request, wherein the one or more data objects includes an ultimate parent object to be returned as a response to the API request;
   generating a dependency graph for the one or more data objects, the dependency graph identifying an order in which the one or more data objects are to be resolved based, at least in part, on parent-child relationships between each of the identified one or more data objects;
   resolving the one or more data objects based on the dependency graph; and
   returning, to the client application, the ultimate parent object as a result of the API request.

2. The method of claim 1, wherein the order in which the one or more data objects are to be resolved comprises an order in which a first data object of the one or more data objects is resolved subsequent to a resolution of child data objects identifying the first data object as a parent data object in object schemas associated with the child data objects.

3. The method of claim 1, wherein generating the dependency graph for the one or more data objects comprises: for a first object of the one or more data objects identified as a child of a second object of the one or more data objects and a parent of a third object of the one or more data objects, structuring the dependency graph such that the third object is resolved prior to a resolution of the first object, and the first object is resolved prior to a resolution of the second object.

4. The method of claim 1, wherein:
   the dependency graph is organized into a plurality of execution levels, and
   resolving the one or more data objects based on the dependency graph comprises:
     identifying concurrently resolvable data objects in one of the plurality of execution levels in the dependency graph; and
     generating one or more queries to resolve the concurrently resolvable data objects; and
     transmitting substantially in parallel, to one or more services associated with the concurrently resolvable data objects, the generated one or more queries for execution.

5. The method of claim 4, wherein generating the one or more queries to resolve the concurrently resolvable data objects comprises:
   identifying a plurality of the concurrently resolvable data objects associated with a common service; and
   for the plurality of the concurrently resolvable data objects associated with the common service, generating a single query to resolve the plurality of the concurrently resolvable data objects associated with the common service.

6. The method of claim 4, wherein concurrently resolvable data objects comprise data objects having a common parent data object identified in object schemas associated with the concurrently resolvable data objects, and wherein the common parent data object has been identified.

7. The method of claim 4, wherein concurrently resolvable data objects comprise data objects having:
   different parent data objects identified in object schemas associated with the concurrently resolvable data objects, and
   no child data objects remaining to be resolved.

8. The method of claim 4, wherein generating the one or more queries to resolve the concurrently resolvable data objects comprises:
- identifying one or more services associated with the concurrently resolvable data objects; and
- for each of the identified one or more services, generating a request for resolution of the concurrently resolvable data objects associated with a particular service of each of the identified one or more services.

9. The method of claim 1, wherein identifying the one or more data objects to resolve to satisfy the query comprises:
- traversing the navigable path through the graph projection of the API; and
- for each node in the navigable path, examining the object schema associated with the node for information specifying the one or more data objects to be resolved for the node.

10. An apparatus for executing data queries in an object schema-based application programming interface (API), comprising:
- a processor configured to:
  - receive an API request from a client application, wherein:
    - the API request identifies a navigable path through a graph projection of the API, and
    - the navigable path includes a plurality of nodes in the graph projection of the API;
  - responsive to receiving the API request, identify one or more data objects to resolve based, at least in part, on an object schema associated with each node in the API request, wherein the one or more data objects includes an ultimate parent object to be returned as a response to the API request;
  - generate a dependency graph for the one or more data objects, the dependency graph identifying an order in which the one or more data objects are to be resolved based, at least in part, on parent-child relationships between each of the identified one or more data objects;
  - resolve the one or more data objects based on the dependency graph, and
  - return, to the client application, the ultimate parent object as a result of the API request; and
- a memory.

11. The apparatus of claim 10, wherein the order in which the one or more data objects are to be resolved comprises an order in which a first data object of the one or more data objects is resolved subsequent to a resolution of child data objects identifying the first data object as a parent data object in object schemas associated with the child data objects.

12. The apparatus of claim 10, wherein the processor is configured to generate the dependency graph for one of the one or more data objects by: for a first object of the one or more data objects identified as a child of a second object of the one or more data objects and a parent of a third object of the one or more data objects, structuring the dependency graph such that the third object is resolved prior to a resolution of the first object, and the first object is resolved prior to a resolution of the second object.

13. The apparatus of claim 10, wherein:
- the dependency graph is organized into a plurality of execution levels, and
- the processor is configured to resolve the one or more data objects based on the dependency graph by:
  - identifying concurrently resolvable data objects in one of the plurality of execution levels in the dependency graph; and
  - generating one or more queries to resolve the concurrently resolvable data objects; and
  - transmitting substantially in parallel, to one or more services associated with the concurrently resolvable data objects, the generated one or more queries for execution.

14. The apparatus of claim 13, wherein generating the one or more queries to resolve the concurrently resolvable data objects comprises:
- identifying a plurality of the concurrently resolvable data objects associated with a common service; and
- for the plurality of the concurrently resolvable data objects associated with the common service, generating a single query to resolve the plurality of the concurrently resolvable data objects associated with the common service.

15. The apparatus of claim 13, wherein concurrently resolvable data objects comprise data objects having a common parent data object identified in object schemas associated with the concurrently resolvable data objects, and wherein the common parent data object has been identified.

16. The apparatus of claim 13, wherein concurrently resolvable data objects comprise data objects having:
- different parent data objects identified in object schemas associated with the concurrently resolvable data objects, and
- no child data objects remaining to be resolved.

17. The apparatus of claim 13, wherein generating the one or more queries to resolve the concurrently resolvable data objects comprises:
- identifying one or more services associated with the concurrently resolvable data objects; and
- for each of the identified one or more services, generating a request for resolution of the concurrently resolvable data objects associated with a particular service of each of the identified one or more services.

18. The apparatus of claim 10, wherein the processor is configured to identify the one or more data objects to resolve to satisfy the query by:
- traversing the navigable path through the graph projection of the API; and
- for each node in the navigable path, examining the object schema associated with the node for information specifying the one or more data objects to be resolved for the node.

19. An apparatus for executing data queries in an object schema-based application programming interface (API), comprising:
- a request processor configured to:
  - receive an API request from a client application, wherein:
    - the API request identifies a navigable path through a graph projection of the API, and
    - the navigable path includes a plurality of nodes in the graph projection of the API;
  - responsive to receiving the API request, identify one or more data objects to resolve based, at least in part, on an object schema associated with each node in the API request, wherein the one or more data objects includes an ultimate parent object to be returned as a response to the API request;
  - generate a dependency graph for the one or more data objects, the dependency graph identifying an order in which the one or more data objects are to be resolved based, at least in part, on parent-child relationships between each of the identified one or more data objects;

resolve the one or more data objects based on the dependency graph, and return, to the client application, the ultimate parent object as a result of the API request; and one or more data stores storing data associated with the identified one or more data objects.

20. The apparatus of claim 19, wherein:

the dependency graph is organized into a plurality of execution levels, and the request processor is configured to resolve the one or more data objects based on the dependency graph by:

identifying concurrently resolvable data objects in one of the plurality of execution levels in the dependency graph; and generating one or more queries to resolve the concurrently resolvable data objects; and transmitting substantially in parallel, to one or more services associated with the concurrently resolvable data objects, the generated one or more queries for execution.

* * * * *